Aug. 4, 1925.

S. HURST 1,548,605

RAKE

Filed Jan. 15, 1924  2 Sheets-Sheet 1

Silvester Hurst
INVENTOR

Aug. 4, 1925.
S. HURST
1,548,605
RAKE
Filed Jan. 15, 1924   2 Sheets-Sheet 2
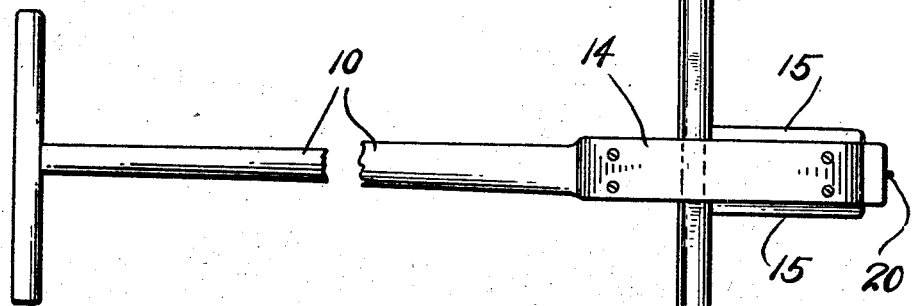
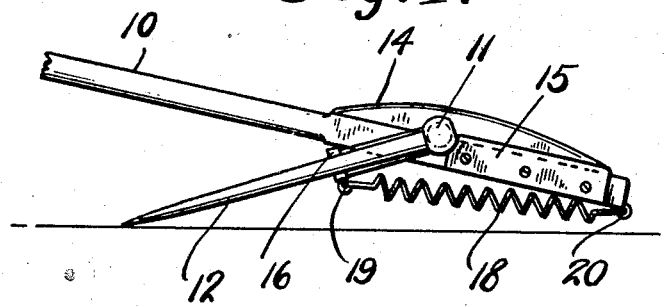
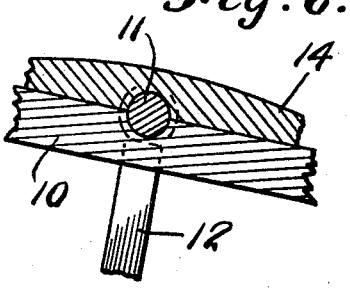
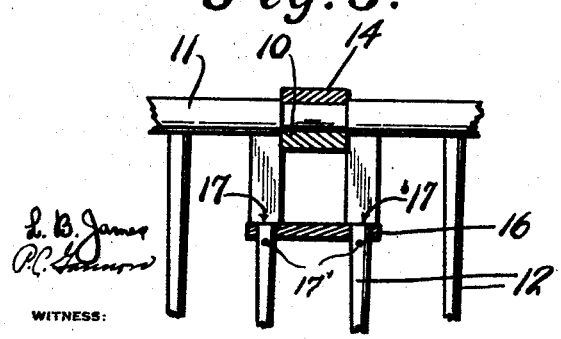
Silvester Hurst
INVENTOR
BY Victor J. Evans
ATTORNEY
WITNESS:

Patented Aug. 4, 1925.

1,548,605

UNITED STATES PATENT OFFICE.

SILVESTER HURST, OF GLENCOE, NORTH DAKOTA.

RAKE.

Application filed January 15, 1924. Serial No. 686,386.

*To all whom it may concern:*

Be it known that I, SILVESTER HURST, a citizen of the United States, residing at Glencoe, in the county of Emmons and State of North Dakota, have invented new and useful Improvements in Rakes, of which the following is a specification.

This invention relates to improvements in rakes and has for an object the provision of a hand rake, the teeth of which will be automatically cleaned during use.

To this end, the invention aims to provide a rake which is constructed so that during the outward movement of said rake, the teeth will be inclined inwardly or toward the gripping end of the handle to drag or remove collected material therefrom, and at the limit of the outward stroke, the teeth will automatically resume proper raking position.

With the above and other objects in view, the invention further includes the following novel features and details of construction, to be hereinafter more fully described, illustrated in the accompanying drawings and pointed out in the appended claims.

In the drawings:—

Figure 3 is a plan view.

Figure 4 is a view similar to Figure 1 with the teeth shown in cleaning position.

Figure 5 is a transverse section.

Figure 6 is an enlarged fragmentary longitudinal section.

Figure 1:
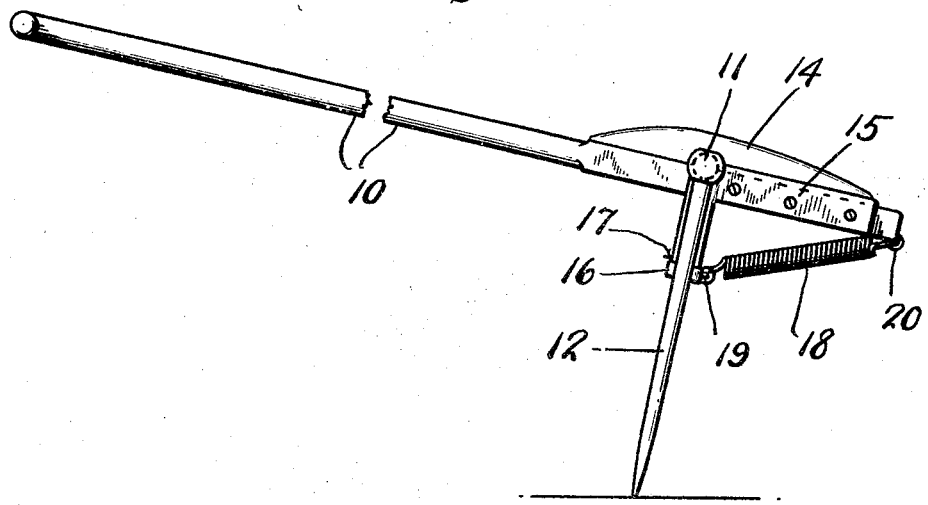
Figure 1 is a side elevation of a rake constructed in accordance with the invention.
Figure 2:
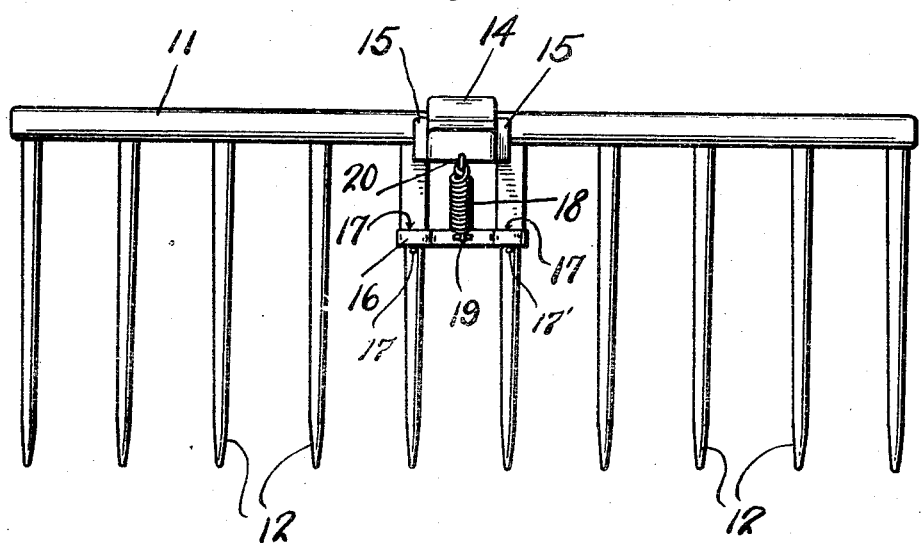
Figure 2 is an end view of the same.

Referring in detail to the drawings wherein like characters of reference denote corresponding parts, the improved rake is shown as comprising a handle 10 which is provided at one end with a bearing for the reception of the bar 11 of the rake head, from which extend teeth 12.

This bearing is formed by cutting away the handle as shown at 13 to provide one-half of the bearing, the other half of which is formed in a bearing plate 14 which is secured to the handle.

The bar 11 is thus capable of pivotal rocking movement upon the handle, this movement being limited in one direction by means of stop plates 15 which are secured upon opposite sides of the handle in the path of the rake teeth.

Movement of the bar and consequently the teeth in an opposite direction is yieldingly resisted and for this purpose, there is provided a supplemental bar 16 which connects two of the teeth, the teeth so connected being provided with shoulders 17 against which the bar 16 abuts. Pins 17' extending through the teeth serve to hold the bar 16 against the shoulders. This bar 16 is connected to one end of a spring 18 as shown at 19, while its opposite end is connected to the handle as shown at 20.

The rake is used in the ordinary manner, the collected material being gathered up as the rake is drawn toward the user. When moved in a reverse direction for the collection of other material, the rake is pushed over the raked surface, whereupon the teeth will fold inwardly against the action of the spring 18 and will be dragged along the surface in a manner to remove any material collected upon the teeth. When the limit of outward movement is reached, the teeth will assume proper raking position, the spring acting to draw the teeth outward until they engage the stop plates 15.

The invention is susceptible of various changes in its form, proportions and minor details of construction and the right is herein reserved to make such changes as properly fall within the scope of the appended claims.

Having described the invention what is claimed is:—

1. A rake comprising a handle, a transversely arranged bar mounted for rocking movement thereon, teeth carried by the bar, stops carried by the handle upon opposite sides thereof and disposed in the path of the teeth for limiting pivotal movement of the bar in one direction and means for yieldingly resisting movement in an apposite direction.

2. A rake comprising a handle, a transversely arranged bar mounted for pivotal movement thereon, teeth carried by the bar, a stop for limiting pivotal movement of the bar in one direction, a supplemental bar connecting some of the teeth and a spring having one end connected to the supplemental bar and its opposite end connected to the handle to yieldingly resist movement of the bar in an opposite direction.

In testimony whereof I affix my signature.

SILVESTER HURST.